(12) United States Patent
Zhang

(10) Patent No.: US 10,567,163 B2
(45) Date of Patent: Feb. 18, 2020

(54) PROCESSOR WITH SECURE HASH ALGORITHM AND DIGITAL SIGNAL PROCESSING METHOD WITH SECURE HASH ALGORITHM

(71) Applicant: VIA Alliance Semiconductor Co., Ltd., Shanghai (CN)

(72) Inventor: Zhi Zhang, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 196 days.

(21) Appl. No.: 15/665,543

(22) Filed: Aug. 1, 2017

(65) Prior Publication Data
US 2018/0375643 A1  Dec. 27, 2018

(30) Foreign Application Priority Data
Jun. 23, 2017  (CN) .......................... 2017 1 0484848

(51) Int. Cl.
| | | |
|---|---|---|
| H04L 9/00 | (2006.01) | |
| H04L 9/06 | (2006.01) | |
| G06F 9/30 | (2018.01) | |
| G09C 1/00 | (2006.01) | |
| H04L 9/30 | (2006.01) | |

(52) U.S. Cl.
CPC ........ H04L 9/0643 (2013.01); G06F 9/30007 (2013.01); G09C 1/00 (2013.01); H04L 9/3093 (2013.01); H04L 2209/122 (2013.01)

(58) Field of Classification Search
CPC ............................ H04L 9/0643; H04L 9/3093
USPC .......................................................... 380/29
See application file for complete search history.

(56) References Cited

U.S. PATENT DOCUMENTS

| | | | |
|---|---|---|---|
| 7,181,009 B1 | 2/2007 | Huxel | |
| 7,346,816 B2 * | 3/2008 | Liu | G11C 29/10 |
| | | | 714/718 |
| 9,773,432 B2 * | 9/2017 | Ghosh | G09C 1/00 |
| 2014/0016773 A1 | 1/2014 | Wolrich et al. | |
| 2017/0147340 A1 * | 5/2017 | Yap | H04L 9/3239 |

OTHER PUBLICATIONS

European Search Report dated Jun. 20, 2018, issued in application No. 17207664.8-1218.

* cited by examiner

*Primary Examiner* — Longbit Chai
(74) *Attorney, Agent, or Firm* — McClure, Qualey & Rodack, LLP

(57) ABSTRACT

A processor using an internal memory to store constants Kt required in a secure hash algorithm (SHA). The latency due to loading the constants Kt from an external memory, therefore, is eliminated. The processor further introduces an instruction set architecture that provides one instruction for the processor to read the constants Kt from the internal memory and perform a particular process on the read constants Kt. Thus, the SHA works efficiently.

18 Claims, 3 Drawing Sheets

PROCESSOR WITH SECURE HASH ALGORITHM AND DIGITAL SIGNAL PROCESSING METHOD WITH SECURE HASH ALGORITHM

CROSS REFERENCE TO RELATED APPLICATIONS

This application claims priority of China Patent Application No. 201710484848.X, filed on Jun. 23, 2017, the entirety of which is incorporated by reference herein.

BACKGROUND OF THE INVENTION

Field of the Invention

The present invention relates to processors with SHA (secure hash algorithm).

Description of the Related Art

SHA (secure hash algorithm) involves an SHA family including SHA-0, SHA-1, SHA-2 and SHA-3. Digital signals are transformed to message digests by SHA. SHA-2 includes SHA 224, SHA 256, SHA 384 and SHA 512. Similar calculations of 32-bit word length are performed in both SHA 224 and 256. Similar calculations of 64-bit word length are performed in both SHA 384 and 512.

The following discussion is about SHA 256.

The logical operations required in SHA 256 are performed in a 32-bit word length, including:

$$Ch(x,y,z) = (x \wedge y) \oplus (\neg x \wedge z)$$

$$Maj(x,y,z) = (x \wedge y) \oplus (x \wedge z) \oplus (y \wedge z)$$

$$\Sigma_0^{\{256\}}(x) = ROTR^2(x) \oplus ROTR^{13}(x) \oplus ROTR^{22}(x)$$

$$\Sigma_0^{\{256\}}(x) = ROTR^6(x) \oplus ROTR^{11}(x) \oplus ROTR^{25}(x)$$

$$\sigma_0^{\{256\}}(x) = ROTR^7(x) \oplus ROTR^{18}(x) \oplus SHR^3(x)$$

$$\sigma_0^{\{256\}}(x) = ROTR^{17}(x) \oplus ROTR^{19}(x) \oplus SHR^{10}(x)$$

N loops of calculations for SHA 256 is discussed below. A loop number i is incremented from 1 to N. For loop i, 512 bits of a digital signal $M^{(i)}$ are divided into 32-bit signal chunks $M_0^{(i)} \sim M_{15}^{(i)}$) to be further expanded to provide 64 signal chunks Wt (t=0 to 63 and Wt is 32 bits long). This step is named message scheduling and the signal chunks Wt are calculated according to the following expression:

$$W_t = \begin{cases} M_t^{(i)} & 0 \leq t \leq 15 \\ \sigma_1^{\{256\}}(W_{t-2}) + W_{t-7} + \sigma_0^{\{256\}}(W_{t-15}) + W_{t-16} & 16 \leq t \leq 63 \end{cases}$$

The 64 signal chunks Wt (t=0 to 63) are used in the 64 iterations for the $i_{th}$ loop of SHA 256. "t" is also known as the iteration number.

Furthermore, 32-bit long constants $K_t^{\{256\}}$ (t=0 to 63) are separately used in the 64 iterations for the $i_{th}$ loop of SHA 256. The 32-bit long constants, $K_0^{\{256\}} \sim K_{63}^{\{256\}}$ are obtained by retrieving 32 bits from the fractional part of each cube root of the first 64 prime numbers.

Furthermore, eight working variables (a, b, c, d, e, f, g, h) are used in the iterations. At the beginning of the $i_{th}$ loop, the eight working variables (a, b, c, d, e, f, g, h) are initialized by the hash values, $H_0^{(i-1)} \sim H_7^{(i-1)}$, obtained from the (i−1)$_{th}$ loop. a=$H_0^{(i-1)}$ b=$H_1^{(i-1)}$ c=$H_2^{(i-1)}$, d=$H_3^{(i-1)}$, e=$H_4^{(i-1)}$, f=$H_5^{(i-1)}$, g=$H_6^{(i-1)}$, h=$H_7^{(i-1)}$. The initial hash values are: $H_0^{(0)}$=6a09e667, $H_1^{(0)}$=bb67ae85, $H_2^{(0)}$=3c6ef372, $H_3^{(0)}$=a54ff53a, $H_4^{(0)}$=510e527f, $H_5^{(0)}$=9b05688c, $H_6^{(0)}$=1f83d9ab, and $H_7^{(0)}$=5be0cd19.

In each iteration, the following calculations are performed:

$$T_1 = h + \Sigma_1^{\{256\}}(e) + Ch(e,f,g) + K_t^{\{256\}} + W_t$$

$$T_2 = \Sigma_0^{\{256\}}(a) + Maj(a,b,c)$$

h=g, g=f, f=e, e=d+$T_1$, d=c, c=b, b=a, and a=T1+T2. The eight working variables, a to h, are updated in the iterations.

After the 64 iterations for the $i_{th}$ loop, Hash values are: $H_0^{(i)}$=a+$H_0^{(i-1)}$, $H_1^{(i)}$=b+$_1^{(i-1)}$, $H_2^{(i)}$=c+$H_2^{(i-1)}$, $H_3^{(i)}$=d+$_3^{(i-1)}$, $H_4^{(i)}$=e+$_4^{(i-1)}$, $H_5^{(i)}$=f+$_5^{(i-1)}$, $H_6^{(i)}$=g+$_6^{(i-1)}$, $H_7^{(i)}$=h+$H_7^{(i-1)}$. The Hash values are used to generate a message digest. For example, Hash values, $H_0^{(N)}$ to $H_7^{(N)}$, obtained in the $N_{th}$ loop are used to generate a 256-bit message digest, that is $H_0^{(N)} \| H_1^{(N)} \| H_2^{(N)} \| H_3^{(N)} \| H_4^{(N)} \| H_5^{(N)} \| H_6^{(N)} \| H_7^{(N)}$.

As shown above, a large number of constants and complex calculations are required in SHA. How to efficiently implement SHA is an important issue in this field.

BRIEF SUMMARY OF THE INVENTION

For SHA, in each iteration (numbered by t) of calculations, the corresponding signal chunk Wt and constant Kt should be added together to get a value Wt+Kt. A processor is introduced in the disclosure that includes an internal memory with the constant Kt stored therein and thereby no time is wasted in loading the required constant Kt from outside the processor and the external communication bus of the processor is not occupied. The processor further introduces to the instruction set an instruction that retrieves the constant Kt from the internal memory and completes a calculation of Wt+Kt. The efficiency of SHA, therefore, is effectively improved.

A processor in accordance with an exemplary embodiment of the disclosure includes an internal memory and a set of execution units. The internal memory stores an array of constants Kt required in a secure hash algorithm. iterations in each loop of the secure hash algorithm are numbered by t, and t changes from 0 to a natural number (L−1) during each loop of the secure hash algorithm. The set of execution units includes an execution unit group required in the secure hash algorithm. The execution unit group retrieves the constants Kt from the internal memory to update working variables used in the secure hash algorithm. In an exemplary embodiment, the execution unit group receives a get-value W+K command. A read address is indicated by the get-value W+K command for the execution unit group to retrieve a constant Kj from the constants Kt stored in the internal memory, wherein j is a natural number. A source operand is required to execute the get-value W+K command. A signal chunk Wj, one of the signal chunks Wt, is provided by the source operand. According to the get-value W+K command, the sum of the signal chunk Wj and the constant Kj is stored into a destination operand of the get-value W+K command as Wj+Kj for the updating of the working variables used in the secure hash algorithm.

A digital signal processing method in accordance with an exemplary embodiment of the disclosure comprises the following steps: providing an internal memory within a processor, wherein the internal memory stores an array of constants Kt required in a secure hash algorithm, iterations in each loop of the secure hash algorithm are numbered by t, and t changes from 0 to a natural number (L−1) during each loop of the secure hash algorithm; and using a set of execution units of the processor to provide an execution unit group required in the secure hash algorithm, wherein the execution unit group retrieves the constants Kt from the internal memory to update working variables used in the secure hash algorithm.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
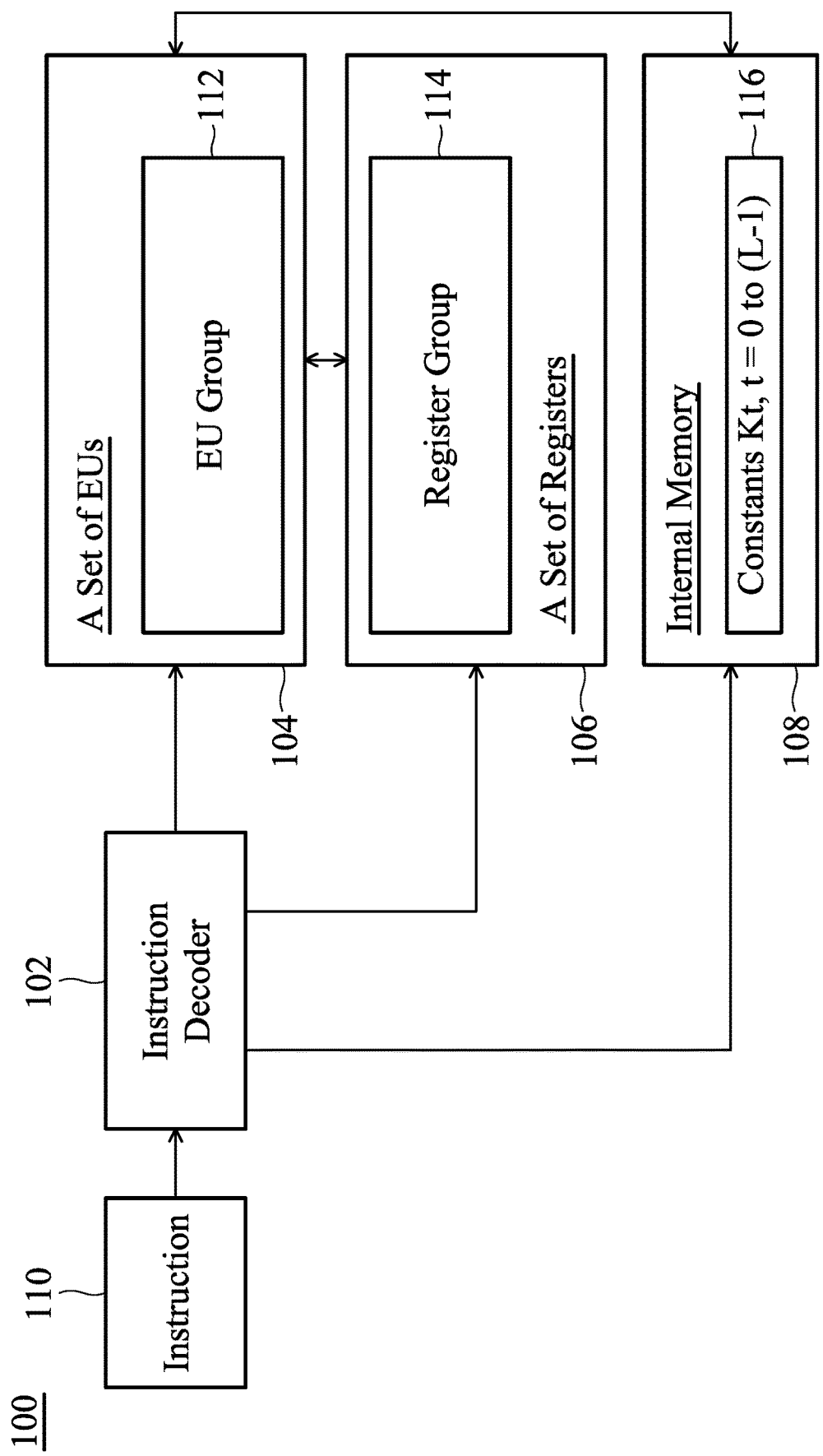
FIG. 1 is a block diagram depicting a processor 100 in accordance with an exemplary embodiment of the disclosure.

FIG. 1 is a block diagram depicting a processor 100 in accordance with an exemplary embodiment of the disclosure. The processor 100 may be an instruction processing apparatus, of which there are various forms. For example, the processor 100 may be a general-purpose processor. The processor 100 may be a complex instruction set computing (CISC) processor, a reduced instruction set computing (RISC) processor, a very long instruction word (VLIW) processor or a combination thereof. Any other form of processor is also allowed to be implemented as the processor 100. The processor 100 may achieve a variety of processor cores, like a general-purpose in-order core, a high-performance general-purpose out-of-order core, or a specific image or scientific computing core. The processor 100 may implement a central processing unit (CPU) with a general purpose function or a coprocessor for specific functions.

As shown, the processor 100 includes an instruction decoder 102, a set 104 of execution units (EUs), a set 106 of registers and an internal memory 108.

The instruction decoder 102 receives and decodes an instruction 110 provided by an instruction fetcher (not shown). According to the instruction 110, the instruction decoder 102 may generate micro code, or one or more micro operations or micro instructions, or other instructions or control signals, or one or more entry points and so on. The instruction decode 102, therefore, drives the set 104 of execution units and controls access to the set 106 of registers and to the internal memory 108.

The set 104 of execution units operating according to the decoded instruction may include arithmetic logic units, circuits, or execution logic with software and hardware design. The set 104 of execution units includes an execution unit (EU) group 112 required in SHA.

The set 106 of registers may be used as source operands or destination operands when the set 104 of EUs operates. The set 106 of registers provides a register group 114 for implementation of SHA. The SHA may also partially utilize a storage space, e.g., a system memory, external to the processor 100 to store data as source operands or destination operands.

The internal memory 108 is allocated to provide a space 116 to store the constants Kt (t=0 to (L−1)) required in the L iterations of SHA. In an exemplary embodiment, the internal memory 108 may be an internal ROM of the processor 100 with factory burned-in values. Taking SHA 256 as an example, the constants burned into the internal memory 108 are $K_t^{\{256\}}$ wherein t=0 to 63. The 32-bit long constants, $K_0^{\{256\}} \sim K_{63}^{\{256\}}$, are obtained by retrieving 32 bits from the fractional part of each cube root of the first 64 prime numbers. From left to right and top to bottom, the 64 constants, $K_0^{\{256\}} \sim K_{63}^{\{256\}}$, are:

| | | | |
|---|---|---|---|
| 428a2f98 | 71374491 | b5c0fbcf | e9b5dba5 |
| 3956c25b | 59f111f1 | 923f82a4 | ab1c5ed5 |
| d807aa98 | 12835b01 | 243185be | 550c7dc3 |
| 72be5d74 | 80deb1fe | 9bdc06a7 | c19bf174 |
| e49b69c1 | efbe4786 | 0fc19dc6 | 240ca1cc |
| 2de92c6f | 4a7484aa | 5cb0a9dc | 76f988da |
| 983e5152 | a831c66d | b00327c8 | bf597fc7 |
| c6e00bf3 | d5a79147 | 06ca6351 | 14292967 |
| 27b70a85 | 2e1b2138 | 4d2c6dfc | 53380d13 |
| 650a7354 | 766a0abb | 81c2c92e | 92722c85 |
| a2bfe8a1 | a81a664b | c24b8b70 | c76c51a3 |
| d192e819 | d6990624 | f40e3585 | 106aa070 |
| 19a4c116 | 1e376c08 | 2748774c | 34b0bcb5 |
| 391c0cb3 | 4ed8aa4a | 5b9cca4f | 682e6ff3 |
| 748f82ee | 78a5636f | 84c87814 | 8cc70208 |
| 90befffa | a4506ceb | bef9a3f7 | c67178f2 |

"t" is used as an index to access $K_t^{\{256\}}$ from the space 116 of the internal memory 108.

An instruction set architecture (ISA) is further introduced in the disclosure for the processor 100 to implement SHA. Specifically, a get-value W+K instruction is newly defined in the disclosed ISA. Following the get-value W+K instruction, the instruction decoder 102 activates the corresponding execution units in the EU group. The activated execution units get the required constant Kt from the space 116 of the internal memory 108, use the register group 114 to provide the required signal chunk Wt as a source operand, and add the two together to get a value Wt+Kt. The get-value W+K instruction does not invoke the loading execution unit (EU) within the set 104 of execution units. Because there is no need to load the constant Kt from outside of the processor 100, the external communication bus of the processor 100 is not occupied and the SHA is not delayed by waiting for the constant Kt to be read from outside of the processor 100.

In an exemplary embodiment, the get-value W+K instruction for SHA 256 may be:

SHA256WKRNDS4xmm1,xmm2,Imm8

Imm8[7:0] indicates the address of the internal memory 108 for an execution unit to get the constants $K_{t+3}^{\{256\}}$, $K_{t+2}^{\{256\}}$, $K_{t+1}^{\{256\}}$ and $K_t^{\{256\}}$ from the internal memory 108. xmm2, a register selected from the register group 114, is used as a source operand that stores Wt+3, Wt+2, Wt+1 and Wt. xmm1 is used as a destination operand for storing the calculation result of the get-value W+K instruction.

$$xmm1 = xmm2 + \{K_{t+3}^{\{256\}}, K_{t+2}^{\{256\}}, K_{t+1}^{\{256\}}, K_{t}^{\{256\}}\}$$

$$= \{Wt+3, Wt+2, Wt+1, Wt\} + \{K_{t+3}^{\{256\}}, K_{t+2}^{\{256\}}, K_{t+1}^{\{256\}}, K_{t}^{\{256\}}\}$$

Corresponding to the get-value W+K instruction, the EU group 112 includes internal memory access EU(s) (for accessing the internal memory 108) and SSE EUs (for addition).

Figure 2:
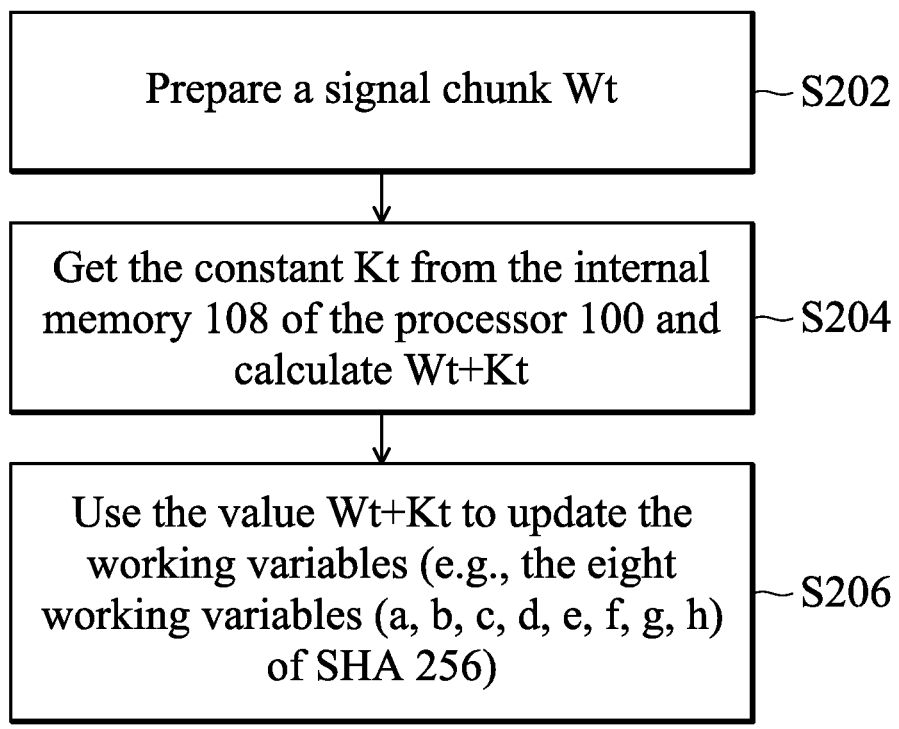
FIG. 2 is a flowchart, in which a portion of calculations of SHA that the processor 100 performs is described.

FIG. 2 is a flowchart, in which a portion of calculations of SHA that the processor 100 performs is described. In step S202, a signal chunk Wt is prepared. In step S204, the processor 100 gets the constant Kt from the internal memory 108 of the processor 100 and calculates Wt+Kt. In step S206, the value Wt+Kt is used to update the working variables (e.g., the eight working variables a to h defined in SHA 256).

Figure 3:
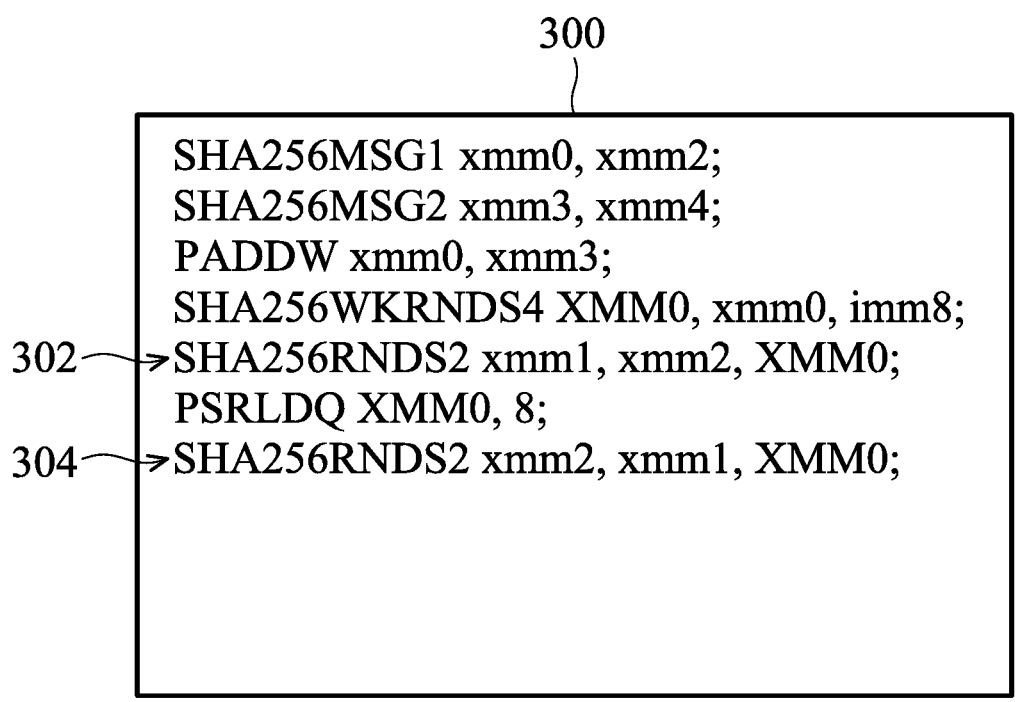
FIG. 3 lists the program code 300 corresponding to the flowchart of FIG. 2, with SHA 256 as an example and involving four iterations numbered t+3, t+2, t+1 and t.

FIG. 3 lists the program code 300 corresponding to the flowchart of FIG. 2, with SHA 256 as an example and involving four iterations numbered t+3, t+2, t+1 and t.

Via the instructions SHA256MSG1, SHA256MSG2 and ADDW corresponding to step S202, signal chunks {Wt+3, Wt+2, Wt+1, Wt} are prepared in a register xmm0 selected from the register group.

The instruction SHA256WKRNDS4 corresponds to step S204 and activates the operations described above. Constants $\{K_{t+3}^{\{256\}}, K_{t+2}^{\{256\}}, K_{t+1}^{\{256\}}, K_{t}^{\{256\}}\}$ are retrieved from the internal memory 108 of the processor 100 and a calculation result $\{Wt+3, Wt+2, Wt+1, Wt\}+\{K_{t+3}^{\{256\}}, K_{t+2}^{\{256\}}, K_{t+1}^{\{256\}}, K_{t}^{\{256\}}\}$ is stored into a register XMM0 selected from the register group 114.

Corresponding to step S206, the instruction SHA256RNDS2 is performed twice with instruction PSRLDQ interspersed therebetween. The calculation result, $\{Wt+3, Wt+2, Wt+1, Wt\}, \{K_{t+3}^{\{256\}}, K_{t+2}^{\{256\}}, K_{t+1}^{\{256\}}, K_{t}^{\{256\}}\}$, stored into the register XMM0 by the instruction SHA256WKRNDS4, is used in four iterations of updating the working variables (a, b, c, d, e, f, g, h). Every time the instruction SHA256RNDS2 is performed, two iterations of updating the working variables (a, b, c, d, e, f, g, h) are realized. The calculations performed in each iteration includes:

$$T_1 = h + \Sigma_1^{\{256\}}(e) + Ch(e,f,g) + K_t^{\{256\}} + W_t$$

$$T_2 = \Sigma_0^{\{256\}}(a) + Maj(a,b,c)$$

h=g, g=f, f=e, e=d+$T_1$, d=c, c=b, b=a, and a=T1+T2. By the instruction SHA256RNDS2 with the reference numeral 302, two iterations (numbered t and t+1) of updating the working variables (a, b, c, d, e, f, g, h) are realized based on the lower bits of the register XMM0, wherein the lower bits of the register XMM0 show $\{Wt+1, Wt\}, K_{t+1}^{\{256\}}, K_t^{\{256\}}$. Using the instruction SHA256RNDS2 with the reference numeral 304, two iterations (numbered t+2 and t+3) of updating the working variables (a, b, c, d, e, f, g, h) are realized based on the lower bits of the shifted content within the register XMM0. At this time, the lower bits of the register XMM0 show $\{Wt+3, Wt+2\}+\{K_{t+3}^{\{256\}}, K_{t+2}^{\{256\}}\}$. The program code 300 of FIG. 3 may be repeated 16 times to complete the 64 iterations (t is changed from 0 to 63) for the $i_{th}$ loop of calculations for SHA 256. After the 64 iterations for the $i_{th}$ loop, Hash values are: $H_0^{(i)}=a+H_0^{(i-1)}$, $H_1^{(i)}=b+_1^{(i-1)}$, $H_2^{(i)}=c+H_2^{(i-1)}$, $H_3^{(i)}=d+_3^{(i-1)}$, $H_4^{(i)}=e+_4^{(i-1)}$, $H_5^{(i)}=f+_5^{(i-1)}$, $H_6^{(i)}=g+_6^{(i-1)}$, $H_7^{(i)}=h+H_7^{(i-1)}$. The Hash values are used to generate a message digest. For example, Hash values, $H_0^{(N)}$ to $H_7^{(N)}$, obtained in the $N_{th}$ loop are used to generate a 256-bit message digest $H_0^{(N)} \| H_1^{(N)} \| H_2^{(N)} \| H_3^{(N)} \| H_4^{(N)} \| H_5^{(N)} \| H_6^{(N)} \| H_7^{(N)}$.

In addition to the SHA 256 embodiments discussed above, SHA 384 and SHA 512 of SHA family may also use the internal memory 108 of the processor 100 to store constants Kt (t=0 . . . (L−1)) and a corresponding get-value W+K instruction may be also provided.

Other techniques that use the above concepts to enable a processor to implement a secure hash algorithm (SHA) are within the scope of the disclosure. Based on the above contents, the present invention further relates to a digital signal processing method.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processor device, comprising:
   an internal memory, storing an array of constants Kt required in a secure hash algorithm, where iterations in each loop of the secure hash algorithm are numbered by t, and t changes from 0 to a natural number (L−1) during each loop of the secure hash algorithm; and
   a set of execution units, including an execution unit group required in the secure hash algorithm,
   wherein:
   the execution unit group retrieves the constants Kt from the internal memory to update working variables used in the secure hash algorithm;
   the constants Kt are factory burned-in values in the internal memory to be directly retrieved by the execution unit group, wherein a total number n of the constants Kt are organized such that each of the constants Kt with a bit length m can be obtained by retrieving the m bits from a fractional part of each cube root of a set of first n prime numbers;
   the execution unit group receives a get-value W+K instruction; and
   a read address of at least one of the constants Kt is directly contained in the get-value W+K instruction for the execution unit group to retrieve at least one of the constants Kt from the internal memory.

2. The processor device as claimed in claim 1, further comprising:
   a set of registers, including a register group for the secure hash algorithm,
   wherein the execution unit group uses the register group to store signal chunks Wt to be added to the constants Kt retrieved from the internal memory to get values Wt+Kt.

3. The processor device as claimed in claim 2, wherein:
   the execution unit group temporarily stores the values Wt+Kt in the register group for updating the working variables used in the secure hash algorithm.

4. The processor device as claimed in claim 1, further comprising:
   a set of registers, including a register group for the secure hash algorithm,
   wherein a source operand for the get-value W+K instruction is implemented by the register group that provides a signal chunk Wj of the signal chunks Wt.

5. The processor device as claimed in claim 4, wherein:
a destination operand for the get-value W+K instruction is implemented by the register group for storing a value Wj+Kj for the updating of the working variables used in the secure hash algorithm; and
the value Wj+Kj is a sum of the signal chunk Wj and the constant Kj.

6. The processor device as claimed in claim 1, wherein:
the read address is indicated by the get-value W+K instruction for the execution unit group to retrieve constants {Kj+3, Kj+2, Kj+1, Kj} of the array of constants Kt from the internal memory, wherein j is a natural number.

7. The processor device as claimed in claim 6, further comprising:
a set of registers, including a register group for the secure hash algorithm,
wherein a source operand for the get-value W+K instruction is implemented by the register group that provides the signal chunks {Wj+3, Wj+2, Wj+1, Wj} of the signal chunks Wt.

8. The processor device as claimed in claim 7, wherein:
a destination operand for the get-value W+K instruction is implemented by the register group for storing values {Wj+3, Wj+2, Wj+1, Wj}+{Kj+3, Kj+2, Kj+1, Kj} for the updating of the working variables used in the secure hash algorithm; and
the values {Wj+3, Wj+2, Wj+1, Wj}+{Kj+3, Kj+2, Kj+1, Kj} are sums of the signal chunks {Wj+3, Wj+2, Wj+1, Wj} and the constants {Kj+3, Kj+2, Kj+1, Kj}.

9. The processor device as claimed in claim 1, wherein:
the secure hash algorithm is SHA 256 and L is 64; and
the constants Kt are 64 constants burned into the internal memory.

10. The processor device as claimed in claim 1, wherein:
the working variables include (a, b, c, d, e, f, g, h) and are updated according to the following expressions in each loop of the secure hash algorithm:

$$T_1 = h + \Sigma_1(e) + Ch(e,f,g) + K_t + W_t;$$

$$T_2 = \Sigma_0(a) + Maj(a,b,c);$$

h=g;
g=f;
f=e;
e=d+$T_1$;
d=c;
c=b;
b=a; and
a=T1+T2.

11. A digital signal processing method, comprising:
providing an internal memory within a processor, wherein the internal memory stores an array of constants Kt required in a secure hash algorithm, iterations in each loop of the secure hash algorithm are numbered by t, and t changes from 0 to a natural number (L−1) during each loop of the secure hash algorithm; and
using a set of execution units of the processor to provide an execution unit group required in the secure hash algorithm, wherein the execution unit group retrieves the constants Kt from the internal memory to update working variables used in the secure hash algorithm, wherein:
the constants Kt are factory burned-in values in the internal memory to be directly retrieved by the execution unit group, wherein a total number n of the constants Kt are organized such that each of the constants Kt with a bit length m can be obtained by retrieving the m bits from a fractional part of each cube root of a set of first n prime numbers;
the execution unit group receives a get-value W+K instruction; and
a read address of at least one of the constants Kt is directly contained in the get-value W+K instruction for the execution unit group to retrieve at least one of the constants Kt from the internal memory.

12. The digital signal processing method as claimed in claim 11 further comprising:
allocating a set of registers of the processor to provide a register group for the secure hash algorithm,
wherein the execution unit group uses the register group to store signal chunks Wt to be added to the constants Kt retrieved from the internal memory to get values Wt+Kt.

13. The digital signal processing method as claimed in claim 12, wherein:
the execution unit group temporarily stores the values Wt+Kt in the register group for the updating of the working variables used in the secure hash algorithm.

14. The digital signal processing method as claimed in claim 11, further comprising:
allocating a set of registers of the processor to provide a register group for the secure hash algorithm,
wherein a source operand for the get-value W+K instruction is implemented by the register group that provides a signal chunk Wj of the signal chunks Wt.

15. The digital signal processing method as claimed in claim 14, wherein:
a destination operand for the get-value W+K instruction is implemented by the register group for storing a value Wj+Kj for the updating of the working variables used in the secure hash algorithm; and
the value Wj+Kj is the sum of the signal chunk Wj and the constant Kj.

16. The digital signal processing method as claimed in claim 11, wherein:
the secure hash algorithm is SHA 256 and L is 64; and
the constants Kt are 64 constants burned into the internal memory.

17. The digital signal processing method as claimed in claim 16, wherein:
the constants Kt include $K_0 \ldots K_{63}$, which are obtained by retrieving 32 bits from the fractional part of each cube root of the first 64 prime numbers; and
each of the signal chunks Wt is 32-bits long and originates from a 512-bit long digital signal that is expected to be processed by SHA 256.

18. The digital signal processing method as claimed in claim 11, wherein:
the working variables include (a, b, c, d, e, f, g, h) and are updated according to the following expressions in each loop of the secure hash algorithm:

$$T_1 = h + \Sigma_1(e) + Ch(e,f,g) + K_t + W_t;$$

$$T_2 = \Sigma_0(a) + Maj(a,b,c);$$

h=g;
g=f;
f=e;
e=d+$T_1$;
d=c;
c=b;
b=a; and
a=T1+T2.

* * * * *